Oct. 7, 1947.   L. LENTZ, JR   2,428,574
CONTROL SYSTEM FOR REDUCING WHEEL SLIPPAGE
Filed Aug. 10, 1945
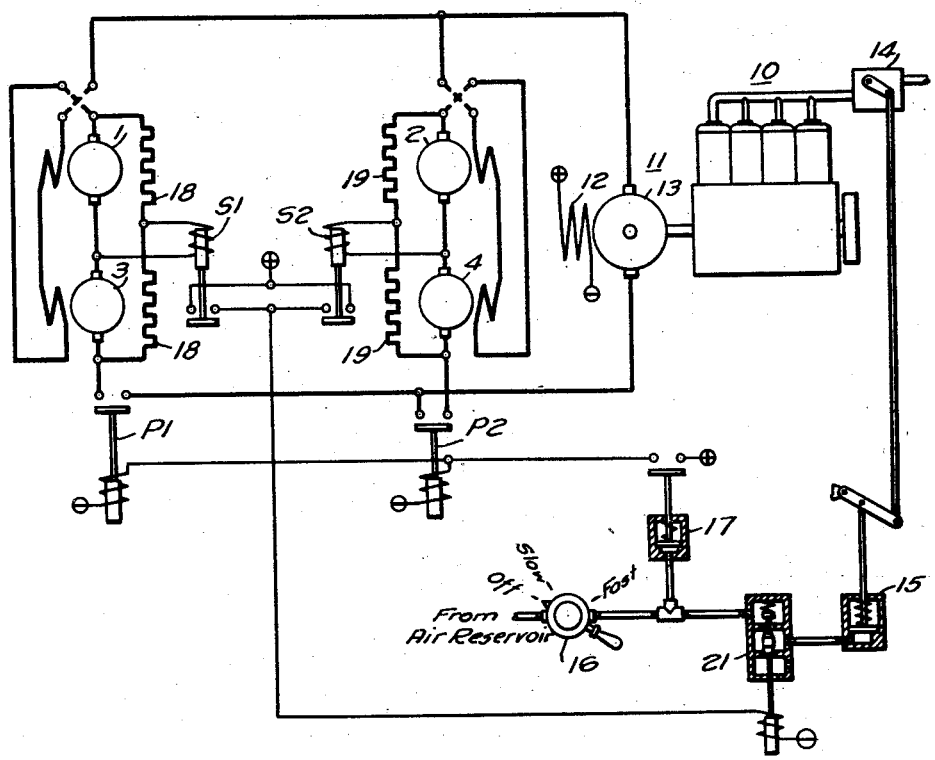
WITNESSES:
INVENTOR
Leon Lentz, Jr.
BY
ATTORNEY Patented Oct. 7, 1947

2,428,574

UNITED STATES PATENT OFFICE 2,428,574

CONTROL SYSTEM FOR REDUCING WHEEL SLIPPAGE

Leon Lentz, Jr., Springfield, Pa., assignor to Westinghouse Electric Corporation, East Pittsburgh, Pa., a corporation of Pennsylvania Application August 10, 1945, Serial No. 610,125

5 Claims. (Cl. 290—17)

My invention relates, generally, to control systems and, more particularly, to systems for controlling the operation of self-propelled locomotives of the Diesel-electric type.

Heretofore, various schemes have been proposed for controlling wheel-slippage on electric locomotives. Some of these schemes have merely provided an alarm system to notify the operator of the slipping condition and are dependent upon the operator to take corrective measures. Other schemes attempt to stop the wheel-slippage by reducing the voltage applied to the driving motors or disconnecting the motors and reducing the output of the prime mover power plant. The prior schemes with which I am familiar are not suitable for use on Diesel-electric locomotives having pneumatic actuators for the engine governors.

Accordingly, an object of my invention is to provide an electropneumatic control system for reducing wheel-slippage on locomotives having engine-driven generators for supplying current to the propelling motors.

Another object of my invention is to stop wheel-slippage on an electrically propelled locomotive without disconnecting the propelling motors from their source of power.

A further object of my invention is to provide for stopping wheel-slippage by automatically reducing the speed of the engine which drives the generator for supplying current to the motors of a locomotive.

Other objects of my invention will be explained fully hereinafter or will be apparent to those skilled in the art.

In accordance with one embodiment of my invention, an electropneumatic valve is utilized to so control the actuator for the engine governor that in case of wheel-slippage the engine speed is reduced, thereby reducing the generator voltage and stopping the wheel-slippage without disconnecting the motors from the generator.

For a fuller understanding of the nature and objects of my invention, reference may be had to the following detailed description, taken in conjunction with the accompanying drawing, in which the single figure is a diagrammatic view of a control system embodying my invention.

Referring to the drawing, the system shown therein comprises an engine 10 which drives a generator 11 having a field winding 12 and an armature winding 13 for supplying current to a plurality of motors 1, 2, 3 and 4, which may be of the series type suitable for propelling a locomotive (not shown). The motors 1 and 3 are connected in series-circuit relation, and the motors 2 and 4 are connected in series-circuit relation. The two groups of motors may be connected in parallel-circuit relation across the armature 13 of the generator 11 by switches P1 and P2. The field winding 12 of the generator 11 may be excited from any suitable source of excitation, such as an exciter (not shown).

The engine 10 is provided with a governor 14 for controlling the engine speed in the usual manner. A pneumatically operated governor actuator 15 is provided for controlling the setting of the governor 14. A manually operable throttle valve 16 controls the admission of compressed air or a similar pressure fluid to the actuator 15, thereby controlling the engine speed.

A pressure-operated throttle switch 17 controls the operation of the motor switches P1 and P2. The cylinder of the switch 17 is connected to the air line between the throttle switch 16 and the actuator 15. The switch 17 is preferably so constructed that its contact members are closed at a lower pressure than that required to operate the actuator 15 to open the governor 14. Thus, when the throttle valve is opened, the switch 17 causes the motor switches P1 and P2 to be closed before the speed of the engine 10 is increased.

In order to stop slippage of the driving wheels of the locomotive, a slip relay S1 is provided for the motors 1 and 3, and a similar slip relay S2 is provided for the motors 2 and 4. As shown, the actuating coil of the relay S1 is connected between the mid-point of a resistor 18 and the connection between the armatures of the motors 1 and 3. Likewise, the actuating coil of the relay S2 is connected between the mid-point of a resistor 19 and the connection between the armatures of the motors 2 and 4. Since the motors are of a similar design, it will be seen that the actuating coils of the relays are connected between points which are normally of the same potential. Therefore, no current flows through the actuating coils of the relays so long as the motors are operating at the same speed.

The contact members of the relays S1 and S2 are connected in parallel-circuit relation and are utilized for controlling the energization of the actuating coil of an electropneumatic valve 21, which is connected in the air line between the throttle switch 17 and the governor actuator 15. The valve 21 is of a type which permits air to flow from the throttle valve 16 to the actuator 15 when the actuating coil of the valve 21 is de-energized. When the coil is energized, the valve 21 stops the flow of air from the throttle valve 16 and permits the air to be exhausted from the actuator 15, thereby closing the governor 14 to reduce the engine speed.

Under normal operating conditions with no slippage of the wheels of the locomotive, a balanced voltage condition exists between the motor circuits, and, as explained hereinbefore, no current flows through the actuating coils of the slip relays S1 and S2. However, in the event that there is slippage of one pair or group of wheels driven by one of the motors, as, for example, the motor 1, the voltage balance is disturbed and the relay S1 closes its contact members to energize the actuating coil of the magnet valve 21.

As previously explained, the magnet valve 21 releases the air for the actuator 15, thereby operating the governor 14 to reduce the engine speed. Since the generator 11 is directly connected to the engine, a reduction in the engine speed reduces the generator speed, thereby reducing the voltage applied to the traction motors. The reduction of voltage impressed on the motors stops the wheel-slippage.

When the wheels stop slipping, a balanced voltage condition again exists and the contact members of the slip relay are opened to deenergize the magnet valve 21. The deenergization of the magnet valve restores air pressure to the actuator 15, which opens the governor to increase the engine speed. The foregoing cycle of operation is repeated upon each occurrence of wheel-slippage during the operation of the locomotive.

It will be noted that the operation of the magnet valve 21 to release the air pressure from the governor actuator 15 does not release the pressure from the throttle switch 17 and, therefore, does not cause the opening of the motor switches P1 and P2 to disconnect the motors from the generator upon the occurrence of wheel-slippage. In this manner the wheel-slippage is corrected without disconnecting any one of the motors from the power source, and there is no interruption of the power supply to the traction motors and no loss of tractive effort of the motors other than that lost by the slipping of the wheels driven by one motor. Since the slipping condition is automatically corrected as quickly as possible, a minimum loss of tractive effort is obtained by utilizing the present system.

From the foregoing description it is apparent that I have provided a system for automatically correcting wheel-slippage on a locomotive, which system is particularly suitable for utilization on a locomotive having a prime mover which is controlled by pneumatic or other fluid pressure devices. Furthermore, the present system provides for a minimum loss of tractive effort as a result of the slipping of the driving wheels of the locomotive.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a locomotive control system, the combination with an engine having a governor, a fluid-pressure actuator for the governor and a throttle valve for controlling the operation of the actuator to vary the engine speed, of a generator driven by the engine, a plurality of motors for propelling the locomotive, switching means for connecting the motors to the generator, said switching means being controlled by said throttle valve, relay means responsive to an unbalance in the motor speeds, and valve means controlled by said relay means to cause the governor actuator to reduce the engine speed.

2. In a locomotive control system, the combination with an engine having a governor, a fluid-pressure actuator for the governor and a throttle valve for controlling the operation of the actuator to vary the engine speed of a generator driven by the engine, a plurality of motors for propelling the locomotive, switching means for connecting the motors to the generator, said switching means being controlled by said throttle valve, relay means responsive to an unbalance in the motor speeds, and valve means controlled by said relay means to cause the governor actuator to reduce the engine speed without opening said switching means to disconnect the motors from the generator.

3. In a locomotive control system, the combination with an engine having a governor, a fluid-pressure actuator for the governor and a throttle valve for controlling the operation of the actuator to vary the engine speed of a generator driven by the engine, a plurality of motors for propelling the locomotive, switching means for connecting the motors to the generator, fluid-pressure means for controlling the operation of said switching means, said throttle valve controlling the admission of pressure fluid to said fluid-pressure means, relay means responsive to an unbalance in the motor speeds, and valve means controlled by said relay means to release the pressure fluid from said actuator without releasing the pressure fluid from said fluid-pressure means, thereby reducing the engine speed without opening said switching means to disconnect the motors from the generator.

4. A system for controlling the operation of an engine which drives a generator, said engine having a governor, a pneumatic actuator for the governor, and a throttle valve for controlling the operation of the actuator to vary the engine speed comprising, in combination, a plurality of motors supplied with current by said generator, switching means for connecting the motors to the generator, a pneumatically actuated switch for controlling said switching means, the closing of said switch being controlled by said throttle valve, relay means responsive to an unbalance in the motor speeds, and an electropneumatic valve controlled by said relay means to cause the governor actuator to reduce the engine speed without opening said switching means to disconnect the motors from the generator.

5. A system for controlling the operation of an engine which drives a generator, said engine having a governor, a pneumatic actuator for the governor, and a throttle valve for controlling the operation of the actuator to vary the engine speed comprising, in combination, a plurality of motors supplied with current by said generator, switching means for connecting the motors to the generator, a pneumatically actuated switch for controlling said switching means, the closing of said switch being controlled by said throttle valve, relay means responsive to an unbalance in the motor speeds, and an electropneumatic valve connected between said pneumatically actuated switch and said governor actuator and controlled by said relay means to cause the actuator to reduce the engine speed without causing said switch to open said switching means to disconnect the motors from the generator.

LEON LENTZ, Jr.

REFERENCES CITED

The following references are of record in the file of this patent:

UNITED STATES PATENTS

| Number | Name | Date |
|---|---|---|
| 2,266,326 | Lillquist | Dec. 6, 1941 |
| 2,280,378 | Cowin | Apr. 21, 1942 |
| 2,303,951 | Oswald | Dec. 1, 1942 |
| 2,304,937 | Lillquist | Dec. 15, 1942 |